June 19, 1962 W. V. HOBSON ET AL 3,039,634
AUTOMOBILE CARRIER FOR OUTBOARD MOTOR
Filed June 8, 1960
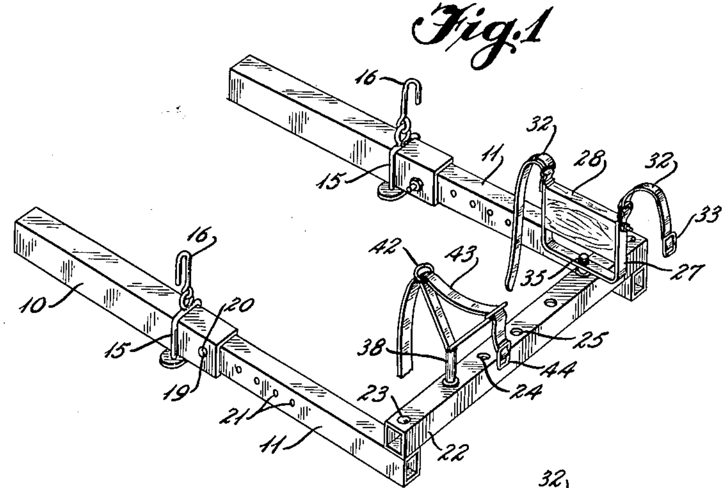
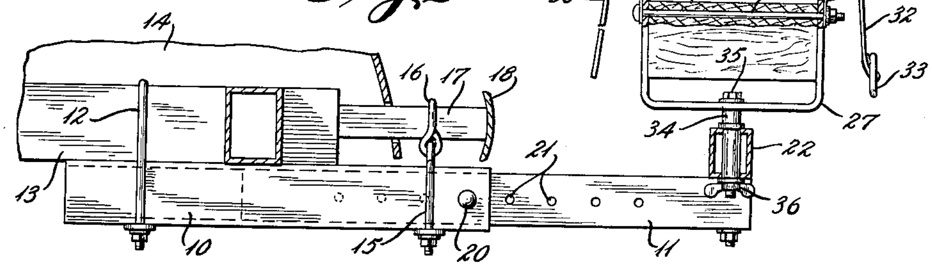
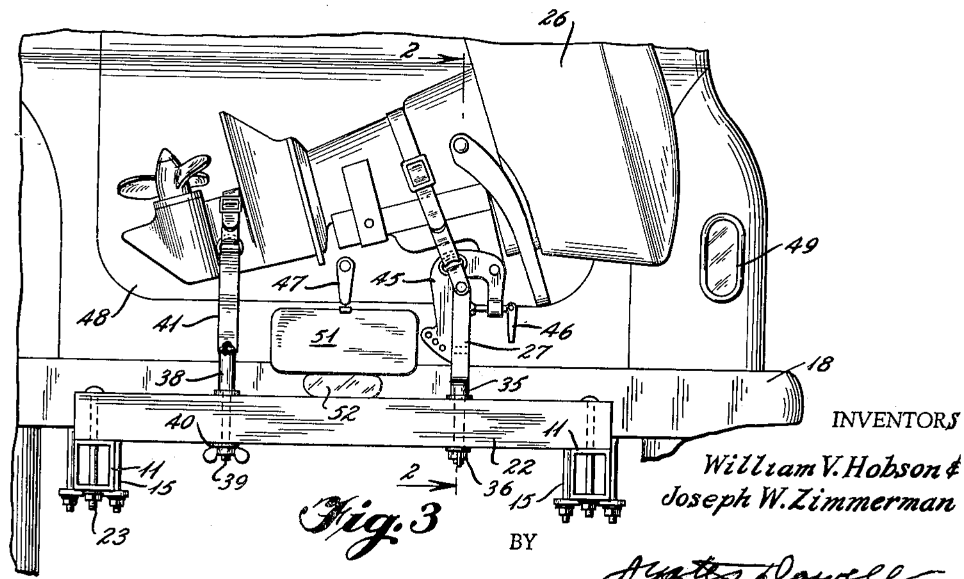
INVENTORS
William V. Hobson &
Joseph W. Zimmerman
BY
A. Yates Dowell
ATTORNEY United States Patent Office 3,039,634
Patented June 19, 1962

3,039,634

AUTOMOBILE CARRIER FOR OUTBOARD MOTOR

William V. Hobson, 212 Loch Lane, Columbia, Mo., and Joseph W. Zimmerman, 9 E. Chestnut, Fulton, Mo.

Filed June 8, 1960, Ser. No. 34,701
6 Claims. (Cl. 214—450)

This invention relates to the handling of commodities of various kinds including outboard motors which are carried to the water's edge and placed upon the stern or transom of a small boat and used for propelling the boat with its occupants over a body of water to a desired destination or for fishing or other purposes.

The invention relates specifically to mechanism for the transportation of an outboard motor easily and conveniently on an automobile without using the space ordinarily occupied by passengers or in which luggage is received and without impairing the full use of the vehicle on which the device is mounted.

The transportation of outboard motors by automobiles has been a problem on account of the damaging of the surfaces of the automobile and nearby objects contacted, the spilling of oil and gasoline, damage to the delicate parts of the outboard motor, and the utilization of passenger or luggage space.

It is an object of the invention to provide an automobile carrier for an outboard motor which carrier is of simple and inexpensive construction, can be readily applied and adjusted to an automobile and to the size of an outboard motor to be transported, and by means of which the outboard motor may be readily fastened in place and transported.

Another object of the invention is to provide an outboard motor carrier having an adjustable frame which can be readily attached directly both to the frame and to the bumper of an automobile and adjusted to accommodate any size outboard motor without interfering with the use of the trunk or blocking the rear vision or protruding above, below or beyond the side of the car and which will not obstruct the vision of the backup or tail lights, as well as to provide a carrier in which the outboard motor will be disposed substantially parallel to the road with the motor end slightly higher than the leg or propeller end and in which the motor is held in fixed relation to the automobile.

A further object of the invention is to provide for an automobile an outboard motor carrier having a pair of brackets to one of which the upper portion of the motor can be attached and the lower portion then swung upwardly onto the other with minimum physical effort, as well as a motor carrier having a trailer hitch.

A still further object of the invention is to provide an outboard motor carrier for attachment to an automobile which carrier includes a pair of length adjustable side members for attachment to the frame and bumper of the automobile with a transverse cross member including a pivoted bracket and a pivoted board on which the outboard motor can be supported more or less universally and with a spaced support and safety strap onto which the lower end of the motor can be swung and the side members of the frame adjusted to locate the motor in the proper position relative to the automobile.

Other objects and advantages of the invention will be apparent from the following description taken in conjunction with the accompanying drawing, wherein:

FIG. 1 is a perspective illustrating one application of the invention;

FIG. 2, a section on the line 2—2 of FIG. 3; and

FIG. 3, a rear elevation with the motor in fully mounted position.

Briefly stated, the automobile carrier for outboard motors, of the present invention, comprises a pair of side members of adjustable length and a rear cross member which may be of any desired length to allow its being cut to size. The side members each are composed of a pair of telescopic members or parts preferably of square cross section for strength, one of which parts is adapted to be solidly attached to the frame by a U-clamp and likewise to be attached to the bumper by the combination of a U-clamp and a hook, the larger of the telescopic members having an opening and the smaller a series of openings spaced longitudinally of the smaller member in order that a locking pin or bolt and nut may be applied for securing the members in the proper adjusted position and the side members of the desired length. Across the rear end of the smaller pair of telescopic members is a cross bar also preferably square in cross section for strength, said cross bar being connected by a bolt and nut to the side members and being provided with a series of longitudinally spaced openings including a central opening which may be used to receive a hitch from a towed vehicle. In the longitudinally spaced openings of the crossbar are mounted a pair of pivoted supports one having a mounting board across the same and with a safety strap so that when the board is parallel to the cross member an outboard motor can be placed over such board and the safety strap fastened and thereafter the lower end of the outboard motor can be raised and placed in the support spaced from the first and the safety strap thereof attached so that the motor will be in fixed position. Thereafter the rear of the two telescopic side members can be moved forwardly and a locking bolt applied in which position the outboard motor will not interfere with the normal use of the vehicle including the opening of the trunk, the operation of the backup and license illuminating lights, or with the rear vision of the driver nor will it extend beyond the sides or above or below the automobile.

With continued reference to the drawing, the automobile carrier for outboard motors comprises a pair of side members of adjustable length, each side member being composed of tubular telescopic members 10 and 11, preferably of square cross section for strength, the larger member 10 being adapted to be fastened by a U-clamp 12 to a frame member 13 of an automobile 14 and also to be fastened by a U-clamp 15 and a hook 16 to a support 17 for a bumper 18.

The larger or receiving tubular telescopic member 10 is provided with an opening 19 for the reception of a locking pin or bolt and nut 20 and the smaller of the telescopic members is provided with a series of longitudinally spaced openings 21 through which a locking pin or bolt and nut 20 can be selectively inserted for securing the telescopic members 10 and 11 in adjusted position.

The rear ends of the smaller telescopic members are connected by cross bar 22 with such cross bar and telescopic members fastened together by a bolt and nut 23. The cross bar has a series of openings 24 for the reception of mounting supports and a central opening 25 for a trailer hitch.

In order to mount an outboard motor 26 (FIG. 3) a pair of mounting supports are provided for the upper or motor and lower or propeller end portions of the outboard motor, such supports comprising a yoke 27 in which is pivoted a board 28 by means of a bolt and nut 29, a ring holding strap 30 being secured by the bolt and nut 29 on the remote sides of the ends of the yoke 27, rings 31 being attached to said straps 30 and carrying adjusting straps 32 adapted to be fastened together by a buckle 33.

The yoke 27 is supported upon and by a spacing sleeve 34 and is secured in position by means of a bolt 35 and a wing nut 36 to the cross member 22, the yoke and board which it carries both being capable of being revolved and providing a universal mounting. A second support is provided in the form of a post 37 having a collar 38 and a lower threaded end 39 to which is attached a wing nut 40. The upper end of the post 37 has attached integral diverging arms 41 with rings 42 at their upper ends for receiving a safety strap 43 with a buckle 44, each of the supports being rotatable in their mountings.

In the mounting of the carrier of an automobile the U-clamps 12 and 15 are employed to firmly secure the larger of each of the tubular telescopic members to the frame and to the bumper support at each side of the rear of the vehicle frame or chassis. The anchoring bolts 20 secure in fixed adjusted position the smaller of the telescopic side members when the bolts 20 are applied and such members are freely adjustable lengthwise within the members 10 when the bolts are removed. The board 28 is then disposed in parallel relation to the cross member 22 and the pivoted attaching bracket 45 of the outboard motor is placed over such board and the handle 46 of the outboard motor is rotated until there is a solid connection between the bracket and the board whereupon the lower or propeller end of the outboard motor is raised and swung approximately 90° onto the strap 43 and the strap is fastened about such lower end of the outboard motor, fastening the same securely in place. It will be understood of course that the support for the smaller or propeller end of the outboard motor will have been placed in the proper opening 24 to accommodate such lower end. The safety straps 32 may then be fastened by the buckle 33 and the spacing of the outboard motor may be satisfactorily accomplished by suitable adjustment of the telescopic members and the fastening of the same in adjusted position by means of the bolts 20 in which position the outboard motor will not interfere with the trunk latch 47 of the automobile or the opening of the trunk door 48 or with the backup or tail lights 49 or the vision of the license plate 50 illuminated by the license plate light 52.

It will be apparent from the foregoing that an automobile carrier for an outboard motor is provided of relatively simple and inexpensive construction which can be easily applied and by which the outboard motor may be loaded with minimum lifting of the same and which when mounted will not interfere with the normal operation of the vehicle.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:

1. An automobile carrier for an outboard motor comprising spaced side members, each composed of tubes square in cross-section and with one tube of a size to be slidably and snugly received within the other and with an opening in the receiving tube and a series of longitudinally spaced openings in the received tube located to register one at a time with the opening in the receiving tube and to have a locking element disposed in the registering openings, U-clamps for attaching the receiving tubes to the frame of an automobile, a combination U-clamp and hook fastened to the receiving tube for attaching the receiving tube to the bumper support of the automobile, a cross member carried at the ends of the received tubes remote from the receiving tubes whereby when the received tubes are adjusted relative to the receiving tubes the cross member will be moved toward and from the receiving tubes, a pair of supporting brackets rotatably and adjustably carried by said cross member, one of said brackets having a mounting board capable of being disposed substantially parallel to said cross member in a position to have an outboard motor clamped thereon and the lower end of the same swung outwardly about its horizontal axis and then swung in a generally horizontal direction onto the other supporting bracket, a safety strap carried by each of said brackets for securing the outboard motor thereto, the length adjustment of the side members permitting the disposition of the cross member with the outboard motor at the desired proximity to the automobile.

2. An automobile carrier for an outboard motor comprising spaced side members, each composed of tubes and with one tube of a size to be slidably and snugly received within the other and with an opening in the receiving tube and a series of longitudinally spaced openings in the received tube located to register one at a time with the opening in the receiving tube, a locking element for disposition in the registering openings, means for attaching the receiving tubes to the frame of an automobile, a cross member carried at the ends of the received tubes remote from the receiving tubes whereby when the received tubes are adjusted relative to the receiving tubes the cross member will be correspondingly adjusted toward and from the receiving tubes, a pair of supporting brackets rotatably and adjustably carried by said cross member, one of said brackets having a pivoted mounting board capable of being disposed substantially parallel to said cross member in a position to have an outboard motor clamped thereon and the lower end of the same swung upwardly about its horizontal axis and then swung in a generally horizontal direction onto the other supporting bracket, means for fastening the outboard motor in place, the length adjustment of the side members permitting the disposition of the cross member with the outboard motor at the desired proximity to the automobile.

3. An automobile carrier for an outboard motor comprising spaced side members each having two elongated parts one lengthwise adjustable relative to the other, means for securing one of each of said side members to an automobile, a cross member carried at the remote end of the other of said side members, spaced outboard motor mounting members adjustable lengthwise and rotatable on said cross member, one of said mounting members including a mounting board on which the upper end of an outboard motor can be clamped whereby the lower end of the outboard motor can be raised and swung substantially 90° onto the other mounting member and said mounting members and said cross member with said outboard motor can be adjusted to the desired location, and locking means for securing said side members in adjusted position.

4. An automobile carrier for an outboard motor comprising spaced side members each having two elongated parts adjustable lengthwise one relative to the other, means for securing said side members to an automobile, a cross member carried by said side members, a pair of spaced mounting members adjustable lengthwise and rotatable on said cross member, one of said mounting members including a mounting board on which the upper end of an outboard motor can be clamped and the lower end of the outboard motor elevated and swung substantially 90° onto the other mounting member and said cross member with said outboard motor thereon moved forwardly to the desired location, and locking means for securing said side members in adjusted position.

5. An automobile carrier for an outboard motor comprising spaced side members, each having a part for attachment to the frame of an automobile and a second part adjustable relative to the first, a cross member carried by said side members, a mounting member rotatable on said cross member and constructed to receive the upper end of the outboard motor while the lower end of the latter is swung into position on said cross member and the latter with the outboard motor thereon adjusted to the desired location.

6. A device which readily can be attached to an automobile and employed for facilitating the loading and for the transportation of an outboard motor by the automobile, said device comprising (1) a pair of mounting members, (a) one including a mounting board on which an outboard motor can be clamped and (b) the other including a support for and onto which a portion of the outboard motor located in spaced relation to the motor can be swung with the greater portion of the weight taken by the mounting member having the mounting board, (2) securing means for fastening an outboard motor to said pair of mounting members, (3) a support for said mounting members by which they may be supported in properly spaced relation to receive an outboard motor, said mounting member with the mounting board thereon being provided about an upright axis on said support, (4) and horizontally extensible mounting means for mounting said support on an automobile in a manner that an outboard motor can be mounted on the mounting members on said support and said support can be moved in a generally horizontal direction nearer to the automobile for transportation and when it is desired to unload the outboard motor the support for said mounting member can be moved further from the automobile for greater accessibility in unloading.

References Cited in the file of this patent

UNITED STATES PATENTS

| | | |
|---|---|---|
| 1,468,779 | Engle | Sept. 25, 1923 |
| 1,482,770 | Terrell | Feb. 5, 1924 |
| 2,429,551 | Hitzemann | Oct. 21, 1947 |
| 2,772,799 | Bridinger | Dec. 4, 1956 |
| 2,785,816 | Fisher | Mar. 19, 1957 |
| 2,860,887 | Stewart | Nov. 18, 1958 |